(12) United States Patent
Jiang et al.

(10) Patent No.: US 9,261,179 B2
(45) Date of Patent: Feb. 16, 2016

(54) END CAP FOR BALL SCREW DEVICE

(71) Applicant: Hiwin Technologies Corp., Taichung (TW)

(72) Inventors: Zong Sian Jiang, Taichung (TW); Mingche Kuo, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 63 days.

(21) Appl. No.: 14/184,864

(22) Filed: Feb. 20, 2014

(65) Prior Publication Data

US 2015/0233454 A1    Aug. 20, 2015

(51) Int. Cl.
*F16H 25/22* (2006.01)
*F16H 25/24* (2006.01)

(52) U.S. Cl.
CPC ........ *F16H 25/2418* (2013.01); *F16H 25/2204* (2013.01); *Y10T 74/19749* (2015.01)

(58) Field of Classification Search
CPC .............................. F16H 25/22; F16H 25/2418
USPC ................... 74/424.82, 424.86; 277/347, 354
See application file for complete search history.

(56) References Cited

U.S. PATENT DOCUMENTS

| | | | | |
|---|---|---|---|---|
| 4,052,076 A | * | 10/1977 | Wysong | 277/354 |
| 4,053,167 A | * | 10/1977 | Jelinek | 277/354 |
| 5,154,091 A | * | 10/1992 | Bianco | 74/424.86 |
| 5,178,029 A | * | 1/1993 | Klinkenberg | 74/89.4 |
| 6,216,821 B1 | * | 4/2001 | Namimatsu et al. | 184/99 |
| 7,128,199 B2 | | 10/2006 | Yang et al. | |
| 7,533,593 B2 | | 5/2009 | Pan et al. | |
| 2008/0250887 A1 | * | 10/2008 | Harada et al. | 74/424.82 |
| 2014/0251049 A1 | * | 9/2014 | Kuroiwa | 74/424.81 |

* cited by examiner

*Primary Examiner* — William Kelleher
*Assistant Examiner* — Jake Cook
(74) *Attorney, Agent, or Firm* — Charles E. Baxley

(57) ABSTRACT

A ball screw device includes a screw engaged into a nut member for forming an endless ball guiding passage and for receiving a number of ball bearing members, two end caps are attached to end portions of the nut member and each include a radially and inwardly extended helical bulge for engaging with the helical groove of the screw, and the nut member includes a peripheral protrusion for engaging with the end cap and for preventing the end cap from being moved radially toward the screw and for preventing the screw from being scrapped by the end cap. The end caps each include a peripheral depression for receiving and engaging with the peripheral protrusion of the nut member.

3 Claims, 3 Drawing Sheets

END CAP FOR BALL SCREW DEVICE

BACKGROUND OF THE INVENTION

1. Field of the Invention

The present invention relates to an end cap for a ball screw device, and more particularly to an end cap including an improved anchoring or securing structure or device for suitably anchoring or securing or retaining the end cap to the ball screw device and for preventing the end cap from being contacted or engaged with the elongated bolt or screw and for preventing the elongated bolt or screw from being scrapped or rubbed by the end cap.

2. Description of the Prior Art

Typical ball screw devices comprise a nut threaded onto an elongated bolt or screw and rotatable and movable or adjustable along the screw, one or more endless ball guiding passages formed in the ball screw device for slidably receiving ball bearing members, and one or more end caps or dust caps or deflectors attached onto the nut and rotatable or movable in concert with the nut relative to the elongated bolt or screw.

For example, U.S. Pat. No. 7,128,199 to Yang et al. discloses one of the typical ball screw return systems comprising a nut engaged onto an elongated bolt or screw and rotatable or movable along the screw, one or more endless ball guiding passages formed in the ball screw device for slidably receiving ball bearing members and for guiding the nut to smoothly rotate or move relative to the elongated bolt or screw, and one or more end caps or dust caps or deflectors attached onto the nut and rotatable or movable in concert with the nut relative to the elongated bolt or screw for enclosing the end portions of the nut and for preventing the dust from entering into the slit or space between the nut and the elongated bolt or screw.

However, the end caps or dust caps or deflectors are attached onto the nut with hooks or clips or latches and may not be solidly and stably anchored or retained or positioned to the nut, and may have a good chance to be moved and contacted or engaged with the elongated bolt or screw such that the elongated bolt or screw may have a good chance to be scrapped or rubbed by the end cap and may be easily and quickly worn out after use.

U.S. Pat. No. 7,533,593 to Pan et al. discloses another typical ball screw device also comprising a nut engaged onto an elongated bolt or screw and rotatable or movable along the screw, a number of ball bearing members disposed or engaged between the nut and the elongated bolt or screw for guiding the nut to smoothly rotate or move relative to the elongated bolt or screw, and one or more end caps or dust caps or deflectors attached onto the nut and rotatable or movable in concert with the nut relative to the elongated bolt or screw for enclosing the end portions of the nut and for preventing the dust from entering into the slit or space between the nut and the elongated bolt or screw.

However, the end caps or dust caps or deflectors are attached onto the nut with hooks or clips and may not be solidly and stably anchored or retained or positioned to the nut, and may have a good chance to be moved and contacted or engaged with the elongated bolt or screw such that the elongated bolt or screw may have a good chance to be scrapped or rubbed by the end cap and may be easily and quickly worn out after use.

The present invention has arisen to mitigate and/or obviate the afore-described disadvantages of the conventional end caps or dust caps or end deflectors for the ball screw devices.

SUMMARY OF THE INVENTION

The primary objective of the present invention is to provide an end cap including an improved anchoring or securing structure or device for suitably anchoring or securing or retaining the end cap to the ball screw device and for preventing the end cap from being contacted or engaged with the elongated bolt or screw and for preventing the elongated bolt or screw from being scrapped or rubbed by the end cap.

In accordance with one aspect of the invention, there is provided a ball screw device comprising an elongated screw including a helical groove formed therein, a nut member including a screw hole formed therein for receiving and engaging with the screw, and including a helical groove for defining the screw hole of the nut member, and the helical groove of the nut member being aligned with the helical groove of the screw for forming an endless ball guiding passage between the nut member and the screw, the nut member including two end portions, a number of ball bearing members engaged in the endless ball guiding passage between the nut member and the screw, and two end caps engaged onto the screw and attached to the end portions of the nut member respectively, the end caps each including a helical bulge extended radially and inwardly therefrom for engaging with the helical groove of the elongated screw, and the nut member includes a peripheral protrusion for engaging with the end cap and for preventing the end cap from being moved radially toward the screw and for preventing the end cap from being contacted or engaged with the elongated screw and for preventing the screw from being scrapped by the end cap.

The end caps each include a peripheral depression formed therein for receiving and engaging with the peripheral protrusion of the nut member and for solidly anchoring the end caps to the nut member. The end caps each include an outer peripheral flange and an inner peripheral flange for forming and defining the inner peripheral depression of the end cap and for engaging the peripheral protrusion of the nut member with the inner peripheral depression of the end cap.

The nut member includes two end portions each having a compartment formed therein for receiving and engaging with the end caps respectively and for stably positioning the end caps in the nut member. The compartments of the nut member include an inner diameter greater than that of the screw hole of the nut member for forming an inner surface in each of the end portions of the nut member, and the peripheral protrusion of the nut member is extended radially and outwardly from the inner surface at the respective end portion of the nut member.

The nut member includes an inner peripheral space formed in each of the end portions of the nut member, and the end caps each include an outer peripheral flange formed by the inner peripheral depression of the end cap and engaged with the inner peripheral space of the nut member.

The nut member includes at least one screw hole formed therein and communicating with the compartment of the nut member for engaging with a screw, and the screw is engageable with the end cap for solidly securing the end cap to the nut member. The helical bulge of the end cap is spaced from the screw for a distance (T) ranging between 0.01 and 0.04 mm.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
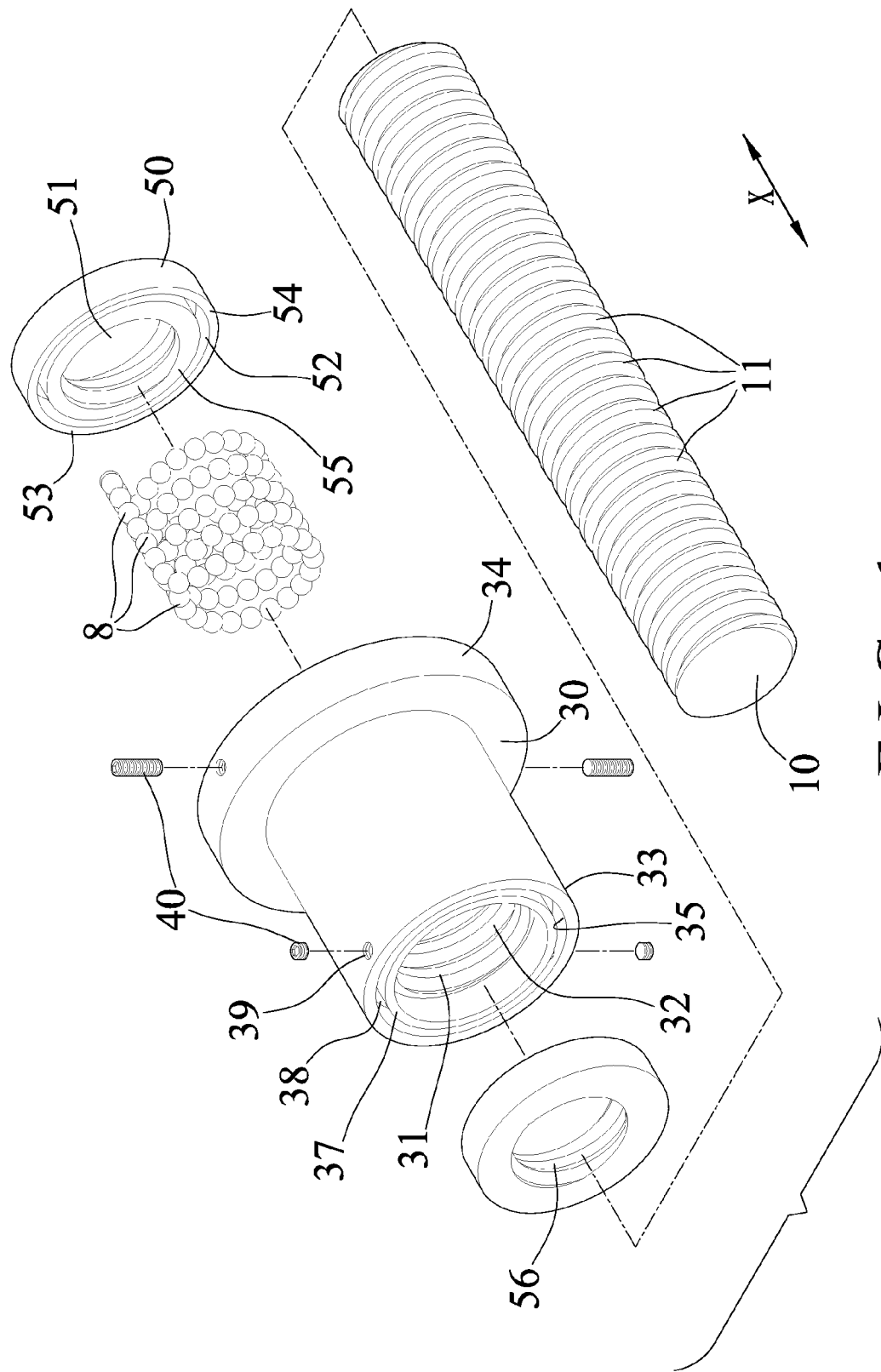
FIG. 1 is an exploded view of a ball screw device including an improved end cap in accordance with the present invention.
Figure 2:
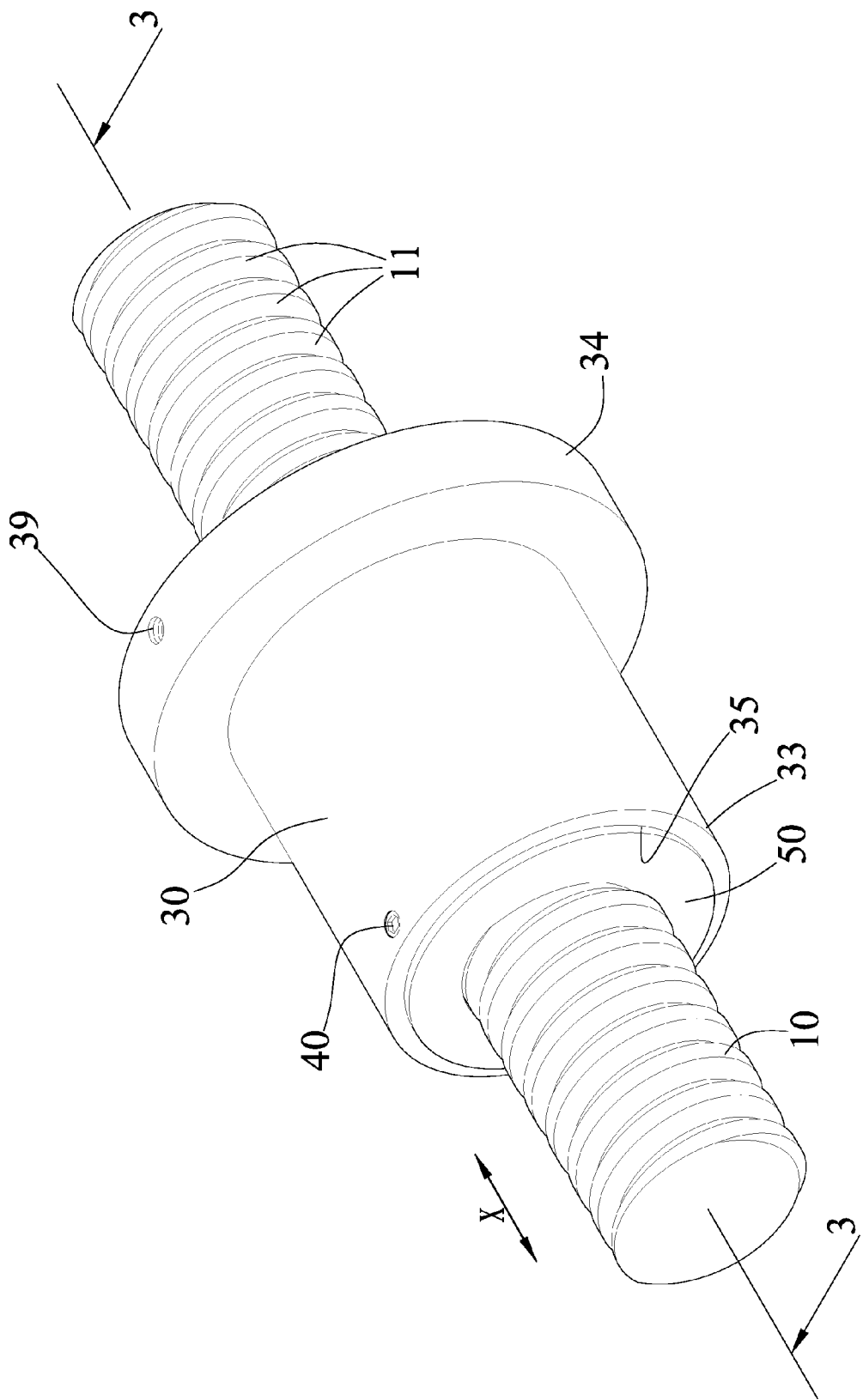
FIG. 2 is a perspective view of the ball screw device.
Figures 3, 4:
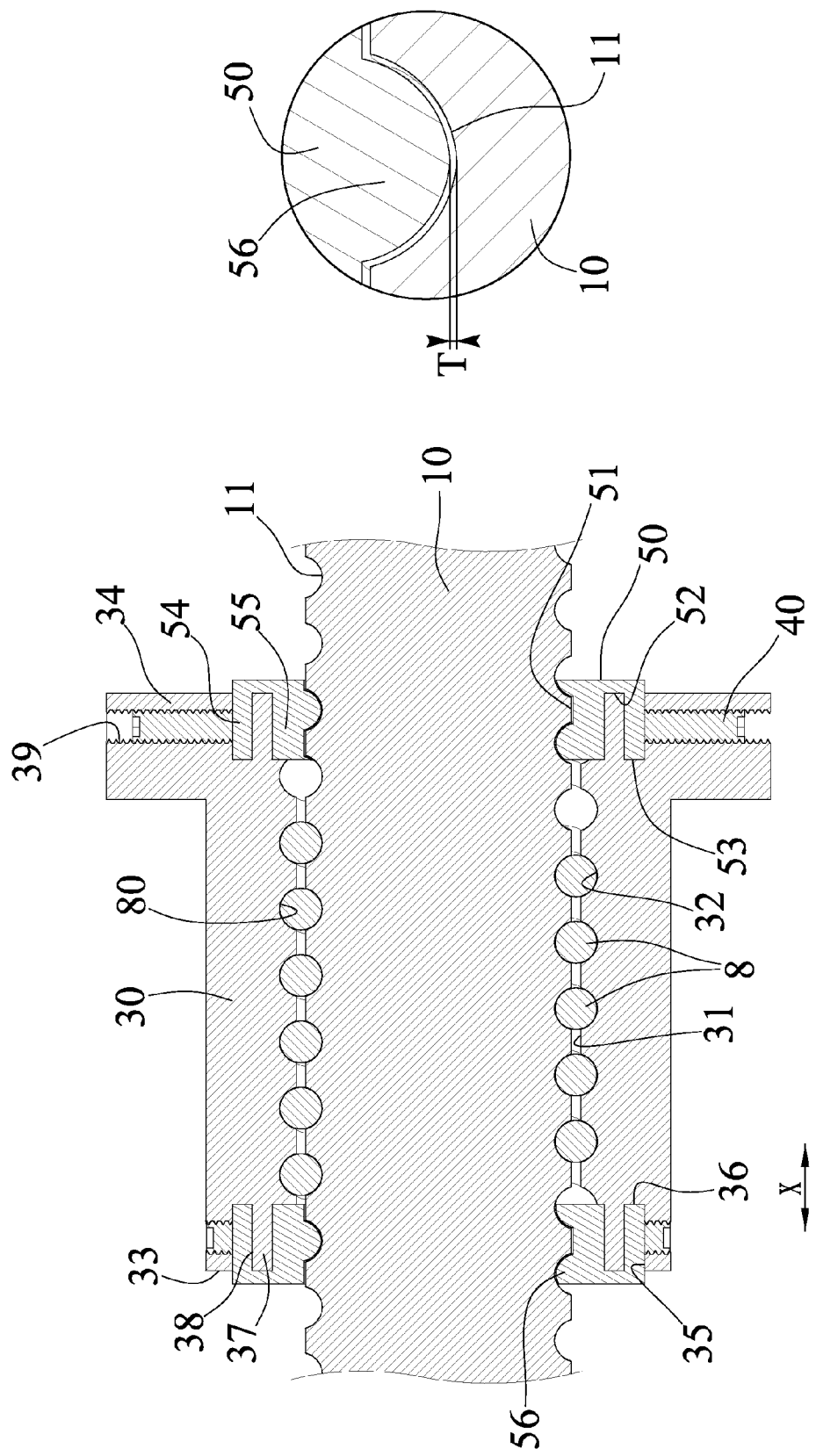
FIG. 3 is a partial cross sectional view of the ball screw device taken along lines 3-3 of FIG. 2.
FIG. 4 is an enlarged partial cross sectional view illustrating operation of the ball screw device.

Referring to the drawings, and initially to FIGS. 1-3, a ball screw device in accordance with the present invention comprises an elongated bolt or screw 10 including one or more helical threaded portions or grooves 11 formed therein, such as formed in the outer peripheral portion thereof for threading or receiving or engaging with the ball bearing members 8. The ball screw device further comprises a nut member 30 including a screw hole 31 formed therein, and formed or defined by one or more helical threaded portions or grooves 32 for receiving or engaging with the elongated screw 10, and for receiving or engaging with the ball bearing members 8, and for allowing the nut member 30 to be smoothly rotated or moved along the elongated screw 10.

The helical threaded portions or grooves 32 of the nut member 30 are directed toward or aligned with the corresponding helical threaded portions or grooves 11 of the elongated screw 10 for forming or defining one or more endless ball guiding passages 80 in the ball screw device or between the nut member 30 and the elongated screw 10 and for slidably receiving or engaging with the ball bearing members 8 and thus for allowing the nut member 30 to be smoothly rotated and moved along the elongated screw 10; i.e., the ball bearing members 8 are disposed or fitted or engaged between the nut member 30 and the elongated screw 10 for guiding the nut member 30 to smoothly rotate or move relative to the elongated screw 10. The above-described structure or configuration for the nut member 30 and the elongated screw 10 and the ball bearing members 8 is typical and will not be described in further details.

The nut member 30 includes two end portions 33, 34 each having a chamber or compartment 35 formed therein and having an inner diameter greater than that of the screw hole 31 of the nut member 30 for forming or defining an inner surface 36 in each of the end portions 33, 34 of the nut member 30, and the nut member 30 further includes a circular or cylindrical or peripheral protrusion 37 extended radially and outwardly from each of the inner surfaces 36 at the end portions 33, 34 of the nut member 30, and/or along the X-axis, and for forming or defining an inner peripheral recess or depression or space 38 in each of the end portions 33, 34 of the nut member 30 and/or between the peripheral protrusion 37 and the respective end portion 33, 34 of the nut member 30. The nut member 30 further includes one or more screw holes 39 formed therein, such as formed in the outer peripheral portion thereof and intersecting or communicating with the compartment 35 or the peripheral space 38 in the end portion 33, 34 of the nut member 30 and for threading or engaging with bolts or latches or fasteners or screws 40.

The ball screw device further comprises two dust caps or end deflectors or end caps 50 to be disposed or engaged onto the elongated screw 10 and to be engaged into the compartments 35 or the spaces 38 of the nut member 30 and to be disposed or attached or mounted or secured to the end portions 33, 34 of the nut member 30 respectively, for example, the end caps 50 each include a substantially ring or O-shaped structure or configuration having a chamber or compartment or bore 51 formed therein for receiving or engaging with the elongated screw 10 and for allowing the end caps 50 to be moved along the elongated screw 10, and each include an inner peripheral space or recess or depression 52 formed in the inner portion 53 thereof for forming or defining an outer peripheral flange 54 and an inner peripheral flange 55.

The peripheral protrusion 37 of the nut member 30 is engageable into the peripheral depression 52 of the respective end cap 50, and/or the outer peripheral flange 54 is engageable into the peripheral space 38 of the nut member 30 for solidly and stably anchoring or retaining or positioning the end cap 50 to the nut member 30 and for preventing the end cap 50 from being forced or moved radially toward or onto the elongated screw 10. The bolts or latches or fasteners or screws 40 are and contactable or engageable with the end caps 50 for solidly and stably attaching or mounting or securing the end caps 50 to the nut member 30. The end caps 50 each further include a helical swelling or thread or bulge 56 extended radially and inwardly therefrom for selectively engaging with or into the helical groove 11 of the elongated screw 10 (FIG. 3).

It is to be noted that, as best shown in FIGS. 3 and 4, the helical bulge 56 of the end cap 50 is engaged into the helical groove 11 of the elongated screw 10, but spaced or disengaged or separated from the elongated screw 10 for a predetermined distance (T, FIG. 4) ranging between 0.01 and 0.04 mm, and solidly and stably anchored or retained or positioned relative to the elongated screw 10 by the engagement of the peripheral protrusion 37 of the nut member 30 with the peripheral depression 52 of the respective end cap 50, and/or the engagement of the outer peripheral flange 54 with the peripheral space 38 of the nut member 30, and thus for preventing the end cap 50 from being forced or moved radially toward or onto the elongated screw 10, and thus for preventing the elongated screw 10 from being scrapped or rubbed by the end cap 50.

In operation, as shown in FIG. 3, the end caps 50 may be solidly and stably attached or mounted or secured to the nut member 30 with the screws 40, and may be solidly and stably anchored or retained or positioned relative to the elongated screw 10 by the engagement of the peripheral protrusion 37 of the nut member 30 with the peripheral depression 52 of the respective end cap 50, and/or the engagement of the outer peripheral flange 54 with the peripheral space 38 of the nut member 30, and may prevent the end cap 50 from being forced or moved radially toward or onto the elongated screw 10, and thus may prevent the elongated screw 10 from being scrapped or rubbed by the end cap 50.

Accordingly, the end cap in accordance with the present invention includes an improved anchoring or securing structure or device for suitably anchoring or securing or retaining the end cap to the ball screw device and for preventing the end cap from being contacted or engaged with the elongated bolt or screw and for preventing the elongated bolt or screw from being scrapped or rubbed by the end cap.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A ball screw device comprising:
an elongated screw including a helical groove formed therein,
a nut member including a screw hole formed therein for receiving and engaging with said screw, and including a helical groove for defining said screw hole of said nut member, and said helical groove of said nut member being aligned with said helical groove of said screw for forming an endless ball guiding passage between said nut member and said screw, said nut member including two end portions each having a compartment formed therein, said compartments of said nut member including an inner diameter greater than that of said screw hole of said nut member for forming an inner surface in each of said end portions of said nut member, a plurality of ball bearing members engaged in said endless ball guiding passage between said nut member and said screw, and two end caps engaged onto said screw and engaged into said compartments of said nut member respectively, and attached to said end portions of said nut member respectively, said end caps each including a helical bulge extended radially and inwardly therefrom for engaging with said helical groove of said elongated screw, said end caps each including a peripheral depression formed therein and said end caps each including an outer peripheral flange and an inner peripheral flange for forming and defining said inner peripheral depression of said end cap, and said nut member including a peripheral protrusion extended radially and outwardly from said inner surface at said respective end portion of said nut member for engaging with said peripheral depression of said end cap and for preventing said end cap from being moved radially toward said screw and for preventing said screw from being scrapped by said end cap, and said nut member including at least one screw hole formed therein and communicating with said compartment of said nut member for engaging with a fastener which is engageable with said end cap for securing said end cap to said nut member.

2. The ball screw device as claimed in claim 1, wherein said nut member includes an inner peripheral space formed in each of said end portions of said nut member, and said end caps each include said outer peripheral flange engaged with said inner peripheral space of said nut member.

3. The ball screw device as claimed in claim 1, wherein said helical bulge of said end cap is spaced from said screw for a distance (T) ranging between 0.01 and 0.04 mm.

* * * * *